Figure 1:
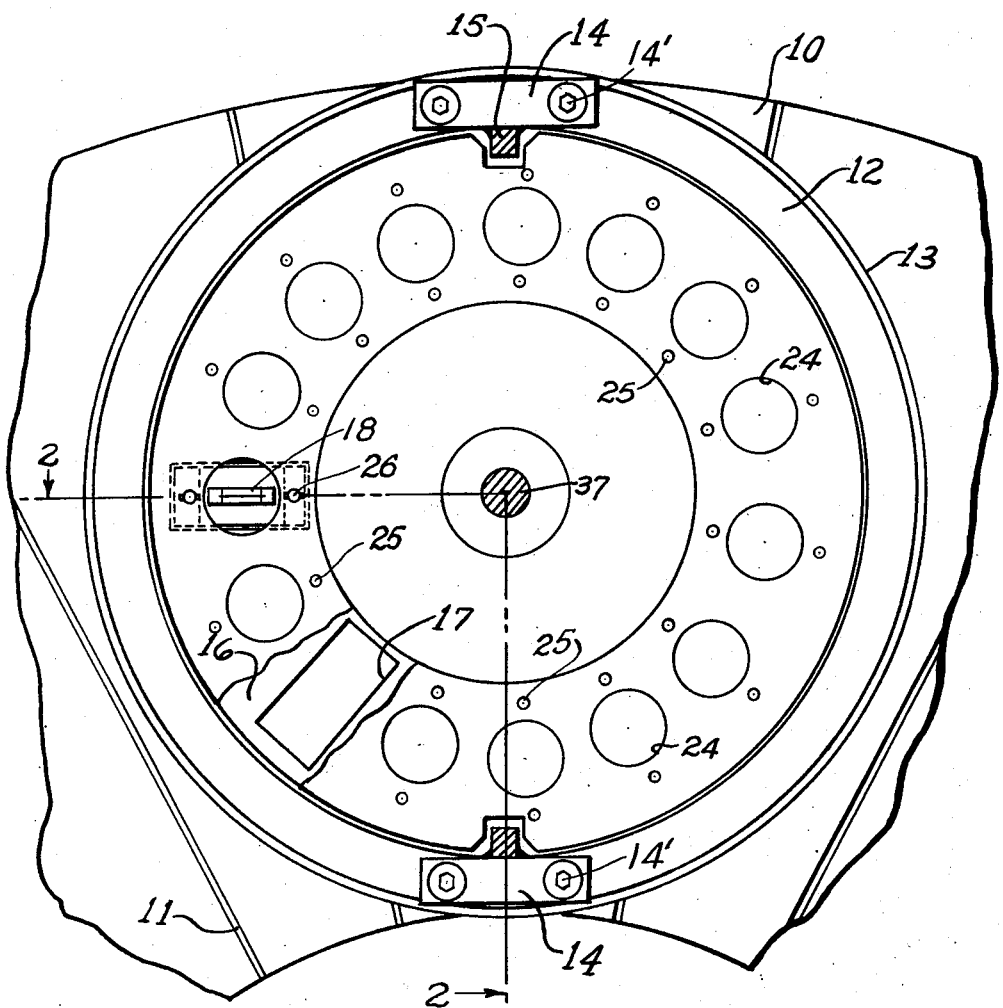

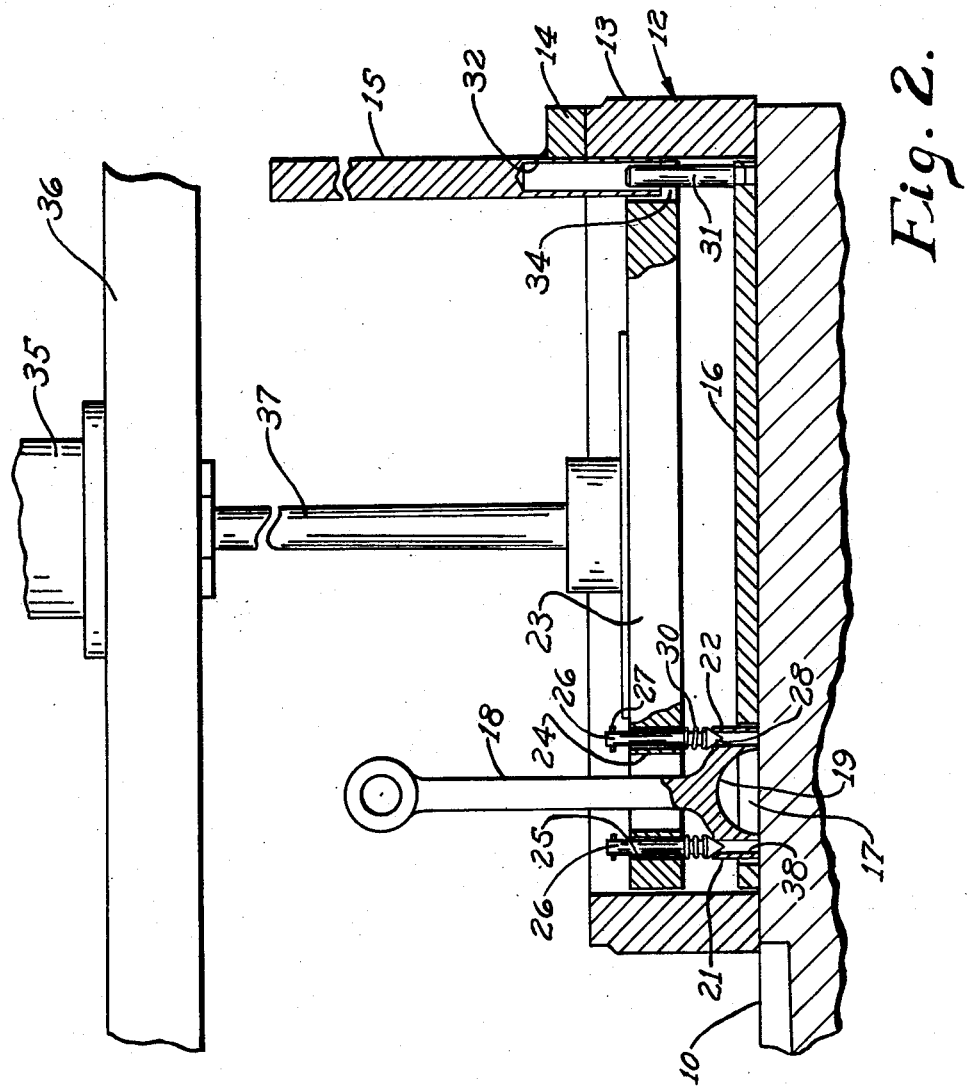

Patented Sept. 29, 1953

2,653,423

UNITED STATES PATENT OFFICE 2,653,423

APPARATUS FOR LAPPING CONNECTING ROD ENDS, CAPS AND SIMILAR ARTICLES

Fred L. White, Chicago, Ill., assignor to Crane Packing Company, Chicago, Ill., a corporation of Illinois Application June 26, 1951, Serial No. 233,534

6 Claims. (Cl. 51—131)

1

The present invention relates to lapping machines and more particularly to an apparatus for lapping connecting rod ends, caps and similar articles to a high degree of flatness. The invention is also concerned with a lapping machine fixture for holding such articles against a lap associated with a machine of the type disclosed in a co-pending application of Raymond G. Roshong, Serial No. 150,978, filed March 21, 1950, now Patent No. 2,627,144 dated February 3, 1953.

In the aforesaid Roshong application, there is disclosed a lapping machine comprising an annular lap on which are mounted one or more rings, the function of which is to dress the lap as the articles are being lapped. The rings, or wear rings as they are commonly termed, are held against revolution with the lap by means of rollers mounted on the ends of a curved bar extending partly across the lap surface and located in line with the direction of thrust of the rings. The interior of the rings is free for the reception of articles to be lapped.

Among the articles which it has been proposed to lap are connecting rod ends and the straps or caps for the connecting rods in order to promote perfect roundness for the crankshaft opening. As commonly made, the connecting rods and caps therefor are first broached to form the opening for the crankshaft and the split, and the cap and connecting rod are then assembled and the opening for the crankshaft pin is finish machined. The cap is then separated from the connecting rod and the connecting rod and cap are assembled with respect to the crankshaft. When the connecting rod and cap are assembled on the crankshaft, there is no assurance that they will assume precisely the same position they occupied when the opening for the crankshaft was machined. The broaching operation leaves the split somewhat rough. It frequently happens that the cap and connecting rod become slightly misaligned due to the failure of the rough mating surfaces at the split to come together in exactly the same place. This results in a slightly oval condition in the opening which in turn decreases the efficiency of the engine.

It is the principal object of this invention to provide an apparatus for finishing the mating surfaces of a connecting rod and its cap in such manner that when the two are reassembled the opening for the crankshaft will be perfectly round.

A more specific object of this invention, in a lapping machine having a rotatable lap, is to

2 provide a fixture for lapping ends of connecting rods of the split type, the rods to be adapted to accommodate a large number of parts simultaneously whereby to secure a greater productivity for each operation.

A more specific object of this invention is to provide a work holder for connecting rods of a reciprocating engine which will serve to hold either the connecting rod or its strap on the lap.

A still more specific object of this invention is to provide a weight for holding the connecting rods on the lap while the connecting rods are being lapped, said weight being supported from the connecting rods through springs and being adapted to move vertically with respect to the surrounding wear ring, but at the same time being locked to the wear ring so that it will rotate with the wear ring at all times.

Another specific object of this invention is to provide a wear ring for a lapping machine of the type described in the aforementioned Roshong application, said wear ring having mounted thereon a hollow tube or rod disposed in a vertical position over the lap, a pressure plate for the connecting rods, said plate being keyed to the hollow rod so as to be slidable axially toward and away from the lap while being held against rotation relative to the wear ring, and a work holder having a pin which is received within the hollow rod so that the pin with its attached work holder are likewise compelled to rotate with the wear ring thereby insuring constant alignment for the openings in the work holder and pressure plate in which the connecting rods are retained.

These and other objects and features of this invention will become apparent from the following detailed description when taken together with the accompanying drawings, in which Fig. 1 is a plan view of a fixture made in accordance with this invention; and Fig. 2 is an elevation in section of the fixture taken along line 2—2 of Fig. 1.

Referring now to the drawings for a detailed description of the invention, there is shown a lap plate 10 such as is disclosed in the aforementioned Roshong application, said lap plate 10 being annular in form and provided with a plurality of radially disposed grooves 11, the function of which is to remove the grit and cuttings from the surface of the lap as well as excess abradant. Said lap is preferably mounted in a horizontal position and is rotated at approximately fifty revolutions per minute. Mounted on the surface of lap 10 is a ring 12 which extends slightly beyond the inner and outer peripheries of the annular lap 10. Said ring is retained on the lap surface by means of rollers and a bar (not shown), the rollers acting upon the outer surface 13 of the ring. The details of construction of the rollers are disclosed in the aforementioned Roshong application and hence will not be detailed here. On opposite sides of the ring 12 are mounted substantially identical straps 14 to which is secured by welding or the like a rod 15 disposed on an axis which is perpendicular to the plane of lap 10. The straps 14 may be affixed to the upper annular surface of the ring 12 by suitable anchoring screws 14'. It is understood, of course, that rod 15 may be formed as an integral part of the strap 14, but for ease of manufacture, a fabricated construction may be desired.

Rod 15 is shown as having a square cross-section which is believed to be the best suited for this device, but it may have other cross-section shapes if desired.

Within ring 12 is a disc 16 which functions as the work separator or holder and which normally rests on the surface of the lap. Said disc 16 is formed with a plurality of openings 17 into which the connecting rods or straps may be inserted. The shape of the opening 17 is the same as the shape of the connecting rod end so that said connecting rod end may fit snugly in opening 17 but at the same time will not be so snug as to prevent a slight amount of movement in the plane of the lap which may be necessary to secure proper alignment between the connecting rod and the other parts of the fixture.

The connecting rod is shown at 18 and is provided with an enlarged end 19 which is semicircular in form and is provided further with bosses 21 and 22 into which the bolt holes are drilled. It will be noted that the connecting rod 18 is relatively long so that any rotation of the rod about the axis of ring 12 will result in a certain amount of centrifugal force in the free end of the connecting rod. This centrifugal force would tend to tilt the connecting rod relative to lap surface 10 and thus result in an undesirable sloped or possibly curved surface in the connecting rod end itself. It is necessary therefore to provide a holding means for the rods to prevent tipping.

The means for holding the connecting rod on the lap surface comprises a relatively heavy disc-shaped plate 23 having a plurality of openings 24 through which the free ends of the connecting rods 18 project. Adjacent openings 24 are openings 25 in which are mounted pins 26. Each pin 26 has a cross pin 27 in its upper end and a conical-shaped point 28 at its other end. The conical point 28 is adapted to fit into the usual bolt hole 38 formed in the connecting rod. The conical ends 28 are constantly urged into the openings by springs 30 which are compressed by the weight of the plate 23, that is, the weight of plate 23 is carried by springs 30 and is transmitted by the springs or the connecting rods 18. In this manner sufficient holding force is developed to resist any centrifugal force which might be present in the rods 18.

It is apparent that the openings 17 in the work holder 16 and the openings 24 in the pressure plate 23 must always be in perfect alignment. If this were not so, then eventually either the work holder 16 or the pressure plate 23 would become displaced relative to one another and would then tend to tip the connecting rod with a resultant defective surface at the split.

The means by which the work holder 16 and pressure plate 23 are kept in alignment comprises a pair of pins 31 secured to work holder 16 and extending at right angles to the surface of the lap 10. The rods which are secured to straps 14 and ring 12, are hollow at their lower ends as shown at 32 to receive pins 31. In this manner work holder 16, pins 31, rods 15 and ring 12 are compelled to rotate together at the same speed. Pressure plate 23 has formed in the outer periphery thereof diametrically opposed notches 34 each of which serves as a keyway for a rod 15. Notches 34 and rods 15 therefore constitute a means for preventing pressure plate 23 from rotating relative to rods 15. Since rods 15 are prevented from turning relative to work holder 16, the pressure plate 23 and work holder 16 are therefore likewise keyed together and consequently tilting of the connecting rod 18 because of misalignment of work holder and pressure plate is prevented.

If desired, pressure plate 23 may be raised and lowered from the work by means of an air or hydraulic cylinder. Such cylinder is shown in fragmentary form at 35 in Fig. 2, the cylinder being mounted on a cross bar 36 of the frame member of the lapping machine so as to be held substantially rigidly in place. The cross bar may be of the form shown in a copending application of Earl J. Bullard, Serial No. 14,619, filed March 12, 1948. The rod 37 operated by cylinder 35 is attached to pressure plate 23 in any suitable manner so that when the cylinder is operated and the piston rod 37 is raised, pressure plate 23 will likewise be raised off the work.

The number of connecting rods which may be lapped at the same time depends entirely upon the size of the ring 12 and lap 10. In the form chosen for illustration, provision is made for lapping fifteen connecting rod ends simultaneously in one ring. In the machine mentioned in the aforesaid Roshong application, four such rings are disclosed so that a total of sixty connecting rod ends may be lapped simultaneously in a machine equipped with fixtures hereinabove disclosed.

Inasmuch as the connecting rod straps or caps are substantially the same shape as the ends of the connecting rods themselves, the same work holder 16 may be used for lapping the split surfaces of the straps or caps, but in view of the low height of each strap, it is not necessary to use an apertured pressure plate such as 23. A solid disc separated from the straps by a layer of felt or other soft pad will suffice (also as shown in the aforesaid Bullard application).

It is understood that the foregoing description is illustrative of preferred embodiments of this invention and that the scope of the invention is not to be limited thereto, but is to be determined by the appended claims.

What is claimed is:

1. Apparatus for lapping the ends of connecting rods and the like comprising a rotatable lap plate having a lap surface, a conditioning ring having a surface thereof in engagement with the lap surface of the lap plate and adapted to condition the latter, means operatively connected to the lap plate for rotating the latter, means holding the conditioning ring on the lap plate against bodily movement around the axis of the lap plate while permitting rotation of the ring about its own axis due to frictional contact thereof with the lap surface, a work holder disposed within the conditioning ring and in contact with the lap surface, there being a plurality of work receiving openings in said work holder adapted to receive therein the ends of the connecting rods to be lapped with the axes of the rods extending vertically, a pressure plate disposed within said conditioning ring above said work holder, there being a series of clearance holes in said pressure plate through which the vertically extending connecting rods are adapted to pass when the rods are in lapping position on the lap surface, and a series of pressure pins depending from said pressure plate, each adapted to bear against a surface of a connecting rod to hold the same on the lap surface against tilting movement.

2. Apparatus for lapping the ends of connecting rods and the like comprising a rotatable lap plate having a lap surface, a conditioning ring having a surface thereof in engagement with the lap surface of the lap plate and adapted to condition the latter, means operatively connected to the lap plate for rotating the latter, means holding the conditioning ring on the lap plate against bodily movement around the axis of the lap plate while permitting rotation of the ring due to frictional contact thereof with the lap surface, said lap surface being adapted to receive thereon the ends of the connecting rods to be lapped with the rods projecting vertically upward therefrom, a pressure plate disposed within said conditioning ring above said lap surface, there being a series of clearance holes in said pressure plate through which the vertically extending rods are adapted to pass when the rods are in lapping position on the lap surface, and a series of pressure pins depending from said pressure plate each adapted to bear against a surface of a connecting rod to hold the same on the lap surface against tilting movement.

3. Apparatus for lapping the ends of connecting rods and the like comprising a rotatable lap plate having a lap surface, a conditioning ring having a surface thereof in engagement with the lap surface of the lap plate and adapted to condition the latter, means operatively connected to the lap plate for rotating the latter, means holding the conditioning ring on the lap surface against bodily movement around the axis of the lap plate while permitting rotation of the ring due to frictional contact thereof with the lap surface, a work holder disposed within the conditioning ring and in contact with the lap surface, there being a plurality of work receiving openings in said work holder adapted to receive therein the ends of the connecting rods to be lapped with the axes of the rods extending vertically, a pressure plate disposed within said conditioning ring above said work holder, there being a series of clearance holes in said pressure plate through which the vertically extending connecting rods are adapted to pass when the rods are in lapping position on the lapping surface, a series of vertically disposed pressure pins slidably mounted in said pressure plate each adapted to bear against a surface of a connecting rod to hold the same on a lap surface against tilting movement, and spring means effective between each pressure pin and the pressure plate for absorbing the vertical thrust of said pins when the latter are in contact with their respective connecting rods.

4. Apparatus for lapping the ends of connecting rods of the type having flanged arch portions and bolt holes extending through the flanges thereof comprising a rotatable lap plate, a conditioning ring having a surface thereof in engagement with the lap surface of the lap plate and adapted to condition the latter, means operatively connected to the lap plate for rotating the latter, means holding the conditioning ring on the lap plate against bodily movement about the axis of the lap plate while permitting rotation of the ring about its own axis due to frictional contact thereof with the lap surface, a work holder disposed within the conditioning ring and in contact with the lap surface, there being a plurality of work receiving openings in said work holder adapted to receive therein the ends of the connecting rods to be lapped with the axes of the rods extending vertically, a pressure plate disposed within said conditioning ring above said work holder, there being a series of clearance holes in said pressure plate through which the vertically extending connecting rods are adapted to pass when the rods are in lapping position on the lap surface, and a series of pressure pins yieldably mounted on said pressure plate and depending therefrom, said pins having tapered ends receivable in the bolt holes of the connecting rods to be lapped to maintain the same on the lap surface against tilting movement.

5. Apparatus for lapping the ends of connecting rods and the like comprising a rotatable lap plate having a lap surface, a conditioning ring having a surface thereof in engagement with the lap surface of the lap plate and adapted to condition the latter, means operatively connected to the lap plate for rotating the latter, means holding the conditioning ring on the lap plate against bodily movement about the axis of the lap plate while permitting rotation of the ring about its own axis due to frictional contact thereof with the lap surface, a work holder disposed within the conditioning ring and in contact with the lap surface, means establishing a positive driving connection between said work holder and the conditioning ring while permitting relative vertical movement of the work holder relative to the conditioning ring, there being a plurality of work receiving openings in said work holder adapted to receive therein the ends of the connecting rods to be lapped with the axes of the rods extending vertically, a pressure plate disposed within said conditioning ring above said work holder, means establishing a positive drive between said pressure plate and the work holder, there being a series of clearance holes in said pressure plate through which the vertically extending connecting rods are adapted to pass when the rods are in lapping position on the lap surface, and a series of pressure pins depending from said pressure plate, each adapted to bear against a surface of a connecting rod to hold the same on the lap surface against tilting movement.

6. Apparatus for lapping the ends of connecting rods and the like comprising a lap plate having a lap surface rotatable about a vertical axis, means operatively connected to the lap plate for rotating the latter, a work holder offset radially from the vertical axis of the lap plate and in contact with the lap surface of the lap plate, there being a plurality of work receiving openings extending through the work holder for receiving therein the ends of the connecting rods to be lapped with the axes of the rods extending vertically, a pressure plate disposed above said work holder, there being a series of clearance holes in said pressure plate through which the vertically extending connecting rods are adapted to pass when the rods are in lapping position on the lap surface, and a series of pressure pins yieldably mounted on said pressure plate and depending therefrom, said pins having tapered ends receivable in the bolt holes of the connecting rods to be lapped to maintain the same on the lap surface against tilting movement, and means for preventing the pressure plate from revolving about the axis of rotation of the lap plate.

FRED L. WHITE.

References Cited in the file of this patent

UNITED STATES PATENTS

| Number | Name | Date |
|---|---|---|
| 1,339,047 | Vincent | May 4, 1920 |
| 1,344,399 | Holt | June 22, 1920 |
| 1,592,105 | Harris | July 13, 1926 |
| 1,594,161 | Evans | July 27, 1926 |
| 2,495,600 | Ramsay | June 24, 1950 |
| 2,539,561 | Wolfskill | Jan. 30, 1951 |
| 2,565,590 | Bullard | Aug. 28, 1951 |

FOREIGN PATENTS

| Number | Country | Date |
|---|---|---|
| 316,017 | Italy | Mar. 14, 1934 |